Jan. 27, 1970 M. P. WOODWARD, JR 3,492,588

MEDIAN SELECTOR FOR REDUNDANT ANALOG SIGNALS

Filed Feb. 24, 1965

United States Patent Office 3,492,588
Patented Jan. 27, 1970

3,492,588

MEDIAN SELECTOR FOR REDUNDANT ANALOG SIGNALS

Morton P. Woodward, Jr., Vestal, N.Y., assignor to General Electric Company, a corporation of New York
Filed Feb. 24, 1965, Ser. No. 434,840
Int. Cl. H04q 3/00
U.S. Cl. 328—137 5 Claims

ABSTRACT OF THE DISCLOSURE

Circuitry for selection of the median from an odd numbered plurality of D.C. signals having particular utility as an alternative to voting or to averaging in redundancy applications. An odd number of identical circuits converging form separate input terminals to a common input terminal with each circuit including an operational amplifier with feedback to amplifier input for unity gain inversion. Highs and lows balance each other at limit valves permitting the median signal to drive the circuitry.

This invention relates to analog data processing systems employing redundancy to improve reliability in which it is necessary to select one signal from among several parallel analog electronic signals, generally three, on the basis that, if no more than one failure has occured, the middle valued signal will be correct.

While this requirement in analogous to "majority voting" with redundant digital signals, there are important differences. With redundant digital signals, correct signals can be relied upon to fall within two ranges, such as two voltage ranges, each of which represents one of two binary values. It is only necessary to determine in which range at least two of triply redundant parallel signals fall, and pass on or generate a proper binary signal in accordance with the input majority and the permitted system tolerances of the two-valued signals. For analog systems, the signal levels are effectively continuously variable and it is obviously important that the median selector not modify the signals being monitored. By using conventional techniques, it has been found that median selection without unreasonable complexity is very difficult to achieve with appropriate reliability. Generally, the problem centers on variable semiconductor characteristics, particularly component characteristics which vary with age and temperature. Typically, diodes are required and are found to have significant changes in resistance, and even diodes which are matched for one temperature and time are not generally matched for all temperatures and times. Straightforward median selector design results in uncompensated diode junctions, or equivalent semiconductor junctions, in series or in parallel with the redundant analog signals tending to cause signal degradation.

Because of problems such as these, it has frequently been found necessary to utilize digital circuits for median selection. The time and complexity involved in conversion from analog signals to digital and then back to analog is obviously undesirable and normally impractical. The difficulties that arise in median selection are generally traceable to the basic requirement of performing two conflicting functions: responding, by processing data signals so as to provide a response which is an accurate reflection of which signal is a median; and switching, by connecting only the median signal to the output without a response which degrades the signals.

Accordingly, it is an object of the invention to provide a simple median selector which produces median signal switching with negligible signal distortion, but with rapid precision discrimination of the median signal.

It is a further object of the invention to provide a practical analog median signal selector which is not sensitive to component resistance variations.

Briefly stated, in accordance with certain aspects of the invention, it has been discovered that a median selector of three parallel analog signals can be provided by three high gain D-C coupled operational amplifiers having limited output levels. By arranging the operational amplifiers with their inputs coupled to receive respective redundant analog signals, with the operational amplifier outputs coupled together, and with separate degenerative feedback connections to each amplifier input for untiy gain inversion, an accurate median selected output signal is produced. However, it is critical that the operational amplifiers produce limited output signals of a constant magnitude for feedback signals, of either polarity, which substantially exceed the error signal necessary to normally maintain unity gain inversion over the permissible range of redundant signals. This limited operational amplifier characteristic is necessary to provide a self-cancelling effect for the non-median redundant signals.

The invention, together with further objects and advantages thereof, may best be understood by referring to the following description taken in conjunction with the appended drawings in which like numerals indicate like parts and in which.

Figure 1:
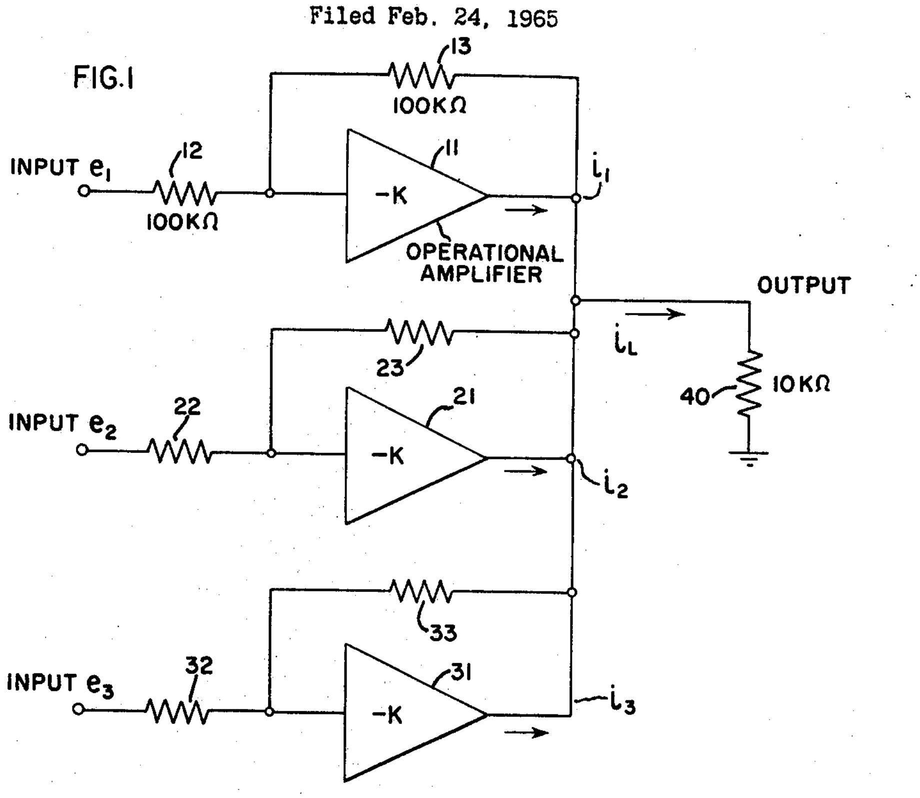
FIGURE 1 is a block diagram of a preferred embodiment of the invention.
Figures 2, 3:
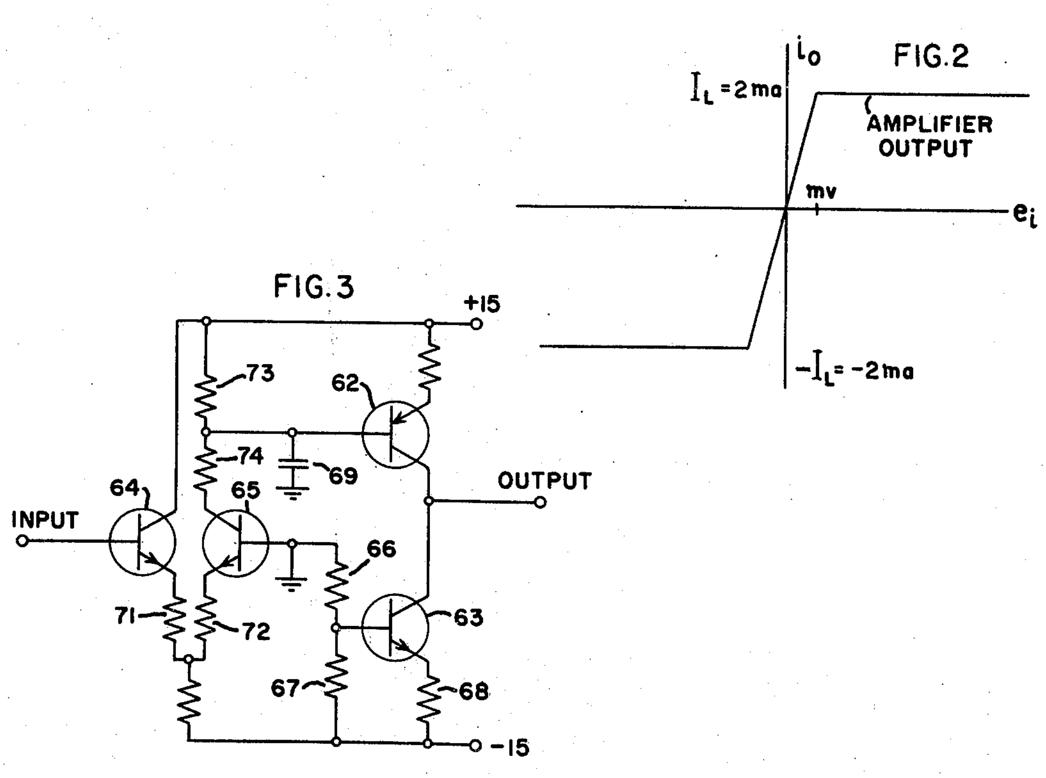
FIGURE 2 is a diagram illustrating the required gain characteristic of the operational amplifiers of FIGURE 1.
FIGURE 3 is a schematic diagram of a suitable operational amplifier for use in the FIGURE 1 median selector.

In the block diagram of FIGURE 1, the triply redundant analog signals $e_1$, $e_2$ and $e_3$ are the input signals for the median selector. Each input signal is combined with a degenerative feedback signal and applied to a D-C coupled operational amplifier 11, 21 and 31, by means of respective input resistors 12, 22 and 32 and feedback resistors 13, 23 and 33. As a result, one operational amplifier generates a current sufficient to balance the median of the input singal with a stable feedback signal. The resistors are conveniently selected to have equal resistance values so as to provide unity gain inversion. The output of the median operational amplifier is applied across the common load resistor 40 to produce a voltage signal equal to the median input signal. The high gain characteristic of each amplifier 11, 21 and 31 is shown in FIGURE 2. With the median signal applied to one of the operational amplifiers, its operation remains within the band of very high, approximately linear, gain, the algebraic sum of the input current and feedback current being small, less than that sufficient to produce the maximum amplifier output. The other operational amplifiers receive input signals which are respectively higher and lower than the median. It has been found that these amplifiers automatically assume conditions whereby one amplifier produces a positive limit output current and the other a negative limit current so that the net effect is cancellation. That is, the relationship between the output load signal and the median input signal is basically the same as for any conventional unity gain inversion circuit which employs the common operational amplifier approach. The operation of the operational amplifier receiving the median signal is essentially the same as if it were operating by itself without being connected to the other operational amplifiers. However, it is connected to the other amplifiers and it supplies the feedback signal for the other amplifiers. With a load resistance of ten thousand ohms, typical values for the input and feedback resistors 12, 13, 22, 23, 32, 33 are one hundred thousand ohms each. Accordingly, the input and feedback resistors operate as voltage dividers for each operational amplifier. This results in a greater demand on the feedback signal portion of the operational amplifier output, which is the only special design requirement on the amplifiers, beyond having a predetermined limit output level. However, merely tripling the feedback signal capability is readily accomplished.

To illustrate operation of the FIGURE 1 median selector, consider redundant selector input signals of 3, 2 and 5 volts respectively for the signals $e_1$, $e_2$ and $e_3$. With these signals, the input resistor 12 of operational amplifier 11 receives the median signal, $e_1=3$ volts and the amplifier generates a current of $-0.3$ milliampere in load resistor 40. Current feedback in resistor 13 is sufficient to substantially balance the input current from input resistor 12, except for the very small error signal necessary to maintain the operational amplifier loop balanced in accordance with the gain K of operational amplifier 11. With an output voltage of minus three volts, the input voltage to operational amplifiers 21 and 31 are, respectively, minus one half volt and plus one volt. For operational amplifiers having an output current limited to two milliamperes, the output of amplifier 21 is plus two milliamperes which is effectively cancelled by the minus two milliamperes from operational amplifier 31.

As described, the operational amplifier branches receiving non-median redundant signals effectively cancel each other. Considered from the point of view of the selector as a whole, this operating condition is essentially the prime function of switching the non-median signals. By insuring that the non-median signals do not affect the output signals, these non-median signals are effectively disconnected from the output. This is accomplished without the use of any switching circuitry. The operational amplifiers provide their usual fast analog response function and in addition perform unique switching functions without complex extra circuitry or conversion of signals to a digital form.

The above description of the operation of the FIGURE 1 median selector is based on the three redundant signals having different signal levels. The accuracy of this description depends upon the gain K of the operational amplifiers. For ordinary gain factors of the order of ten thousand, a difference of a small fraction of one percent of a non-median signal from the median signal results in the operational amplifier being driven to its output limit level. Furthermore, even in the rare case where the non-median signal is too close to the median signal to drive the operational amplifier to its limit, the regenerative action of the unity gain loop produces a response which has the maximum amplifier output as the limiting case and the median selector output is unaffected. These relationships hold well over a large range of gains, even down to gain factors of 50 or 100, although low gain results in some error. When two or more of the redundant signals are so close together that their difference is near the minimum sufficient to drive the operational amplifier to its limit, this difference is too insignificant to be of analytic interest. If the median selector output is within the range of the two nearly identical signals, the output will have an accuracy surpassing the system requirements. Where the difference between two redundant signals is insignificant, it is only necessary that the output signal follow one or both, without the third signal affecting it.

The limited, very high gain operational amplifier shown in FIGURE 3 in schematic form is an example of a suitable D-C coupled operational amplifier for use in the FIGURE 1 median selector. The circuit is comprised of an input stage, utilizing transistors 64 and 65 to provide a balanced differential amplifier for voltage gain with a low D-C offset, and of an output stage, utilizing transistors 62 and 63 as a pair of limited current generators such that the overall transfer function is as shown in FIGURE 2. Transistor 63 generates a constant collector current of minus two milliamperes, as determined by voltage divider resistors 66 and 67 which fix the base voltage, and resistor 68 fixes the emitter current. In a similar manner, transistor 62 generates a variable current from plus four to minus zero milliamperes. The base voltage of transistor 62, instead of being fixed, is controlled by the input stage as the collector voltage of transistor 65 varies from zero volts to plus fifteen volts. Capacitor 69 has a capacitance selected to maintain the loop stable. The input stage, with transistor 64 connected as an emitter-follower and transistor 65 connected as a grounded-base amplifier, operates as a conventional differential amplifier. Small resistors 71 and 72 are connected in series with the respective emitters of transistors 64 and 65 to compensate for changes of the transistor betas with temperature. Resistors 73 and 74 provide the voltage divider for the base of current generating transistor 62 which is accordingly varied by the collector voltage of transistor 65. As a result, the combined generated currents produce a net output current that varies from plus two to minus two milliamperes.

The type of circuitry involved, operational amplifier loops, enables the median selector to follow rapidly varying signals. The choice of specific operational amplifiers is largely determined by the expected frequency characteristics of the redundant signals. However, standard operational amplifiers can generally follow many signals which are normally considered A-C signals. For example, a median selector utilizing the FIGURE 3 type of operational amplifier can readily select the median of triply redundant synchro signals without special provisions.

The relative simplicity of the median selector becomes more important as the complexity of the intended system application increases, because in triply redundant systems, it is necessary to provide three median selectors at each failure correction point, except for the final output.

It will be apparent to those skilled in the art that a median selector as shown in FIGURE 1 can be modified to perform additional functions. For example, by selecting different feedback resistors, signal gain or attenuation can be obtained. Similarly, the median selection operation can be combined with other functions such as signal balancing to attenuate failure transients. Also, the median selector can be implemented with other components such as vacuum tubes which are arranged to provide operational amplifiers having limited output levels such as by adding conventional limiter circuits.

While particular embodiments of the invention have been shown and described herein, it is not intended that the invention be limited to such disclosure, but that changes and modifications can be made and incorporated within the scope of the claims.

What is claimed is:

1. A median selector, for monitoring the operation of data processing apparatus in which three or more redundant signals are processed to determine which redundant signal is a median signal and therefore an acceptable signal, and for connecting the median signal to an output circuit for further utilization without degradation, comprising:

(a) at least three high gain, operational amplifier loops, each operating upon one of the redundant signals to generate output signals accurately proportional to the redundant signals;

(b) each of said operational amplifier loops incorporating output signal limiting circuitry and interconnecting means for connecting all of the loop output signals together, so that the non-median redundant signals drive their operational amplifiers to the limited signal level conditions which cancel, and the median redundant signal determines the net output signal and provides the feedback signals which tend to keep the non-median loops in their limit conditions.

2. An analog median selector for redundant systems comprising:

(a) at least three high negative gain amplifiers, each responsive to one of three redundant analog voltage input signals;
(b) interconnecting means for providing a common output point for all of said amplifiers;
(c) feedback branches for each of said amplifiers, coupled between the common output and inputs of respective said amplifiers to provide closed-loop inversion;
(d) limiting means in each of said amplifiers adapted to produce cancellation between the output signals of said amplifiers which receive non-median signals.

3. An analog median selector for redundant systems comprising:

(a) three operational amplifiers, each responsive to one of three redundant analog signals;
(b) output means, for providing the desired median signal, coupled in common to the output of each of said operational amplifiers;
(c) three feedback branches coupled between the outputs and inputs of respective operational amplifiers;
(d) each of said operational amplifiers having circuitry which provides normal high gain operational amplifier operation for low level input signals but which limits the output signals to a fixed level, whereby the outputs of the amplifiers receiving the highest and lowest level input signals cancel each other.

4. An analog median selector for redundant systems comprising:

(a) three operational amplifiers, producing negative high gain, adapted to respond to three redundant analog voltage signals;
(b) three input summing resistors of equal resistance, each resistor connected to apply one of said redundant signals to one of said amplifiers;
(c) a load resistor, for providing the desired median signal output, coupled in common to the output of each of said operational amplifiers;
(d) three feedback resistors, having resistance values equal to said input resistors, coupled between the common output and inputs of respective said operational amplifiers and adapted to provide unity gain inversion;
(e) each of said operational amplifiers including an output stage having a limited variable current generator and an input stage having a differential amplifier circuit, whereby the gain factor is greater than fifty for low level error signals, but the output current is limited to a constant level for error signals substantially exceeding the error signal produced with the maximum redundant signal voltage in unity gain inversion.

5. An analog median selector for redundant systems consisting of:

(a) an odd numbered plurality of identical redundant circuits converging from individual input terminals to a common output terminal;
(b) each said redundant circuit including
    (1) a high negative gain amplifier with its output connected to said output terminal,
    (2) a feedback resistor connected in parallel to said amplifier, and
    (3) an input resistor connected in series between said input terminal and said parallelly connected feedback resistor and amplifier;
(c) said amplifiers each including an output stage having a limited variable current generator limiting the output currents to a fixed positive or negative level whereby the outputs of those said redundant circuits other than that of the one carrying the median signal will cancel out.

References Cited

UNITED STATES PATENTS

| | | | |
|---|---|---|---|
| 3,243,585 | 3/1966 | Escobosa | 330—124 X |
| 3,305,733 | 2/1967 | Jahn. | |

OTHER REFERENCES

Millman and Taub: Pulse, Digital, and Switching Waveforms, McGraw-Hill, New York, 1965, pp. 242–246 relied on.

DONALD D. FORRER, Primary Examiner

U.S. Cl. X.R.

307—204, 219, 235; 328—117, 147